Sept. 15, 1936. A. L. FREEDLANDER 2,054,620
PRINTING MEDIUM AND METHOD OF MANUFACTURING
Filed Sept. 26, 1934
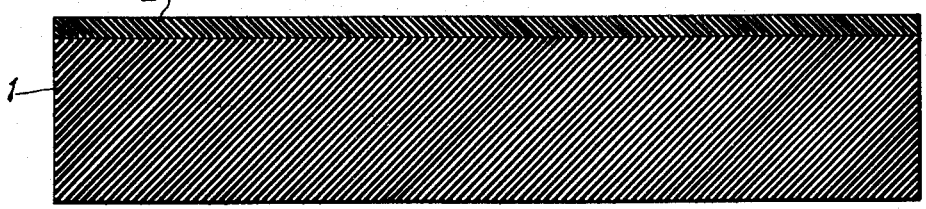
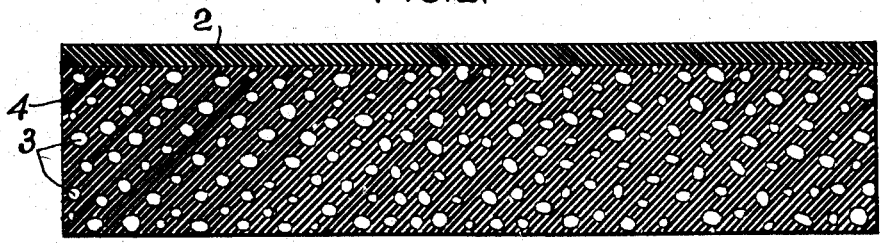
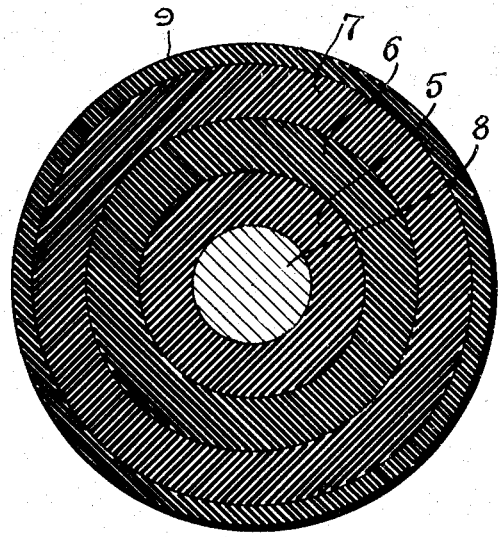
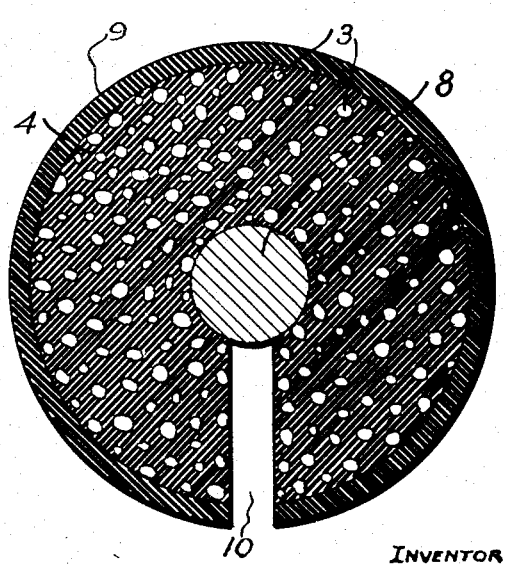
INVENTOR
ABRAHAM L. FREEDLANDER,
BY
Toulmin & Toulmin
ATTORNEYS Patented Sept. 15, 1936

2,054,620

UNITED STATES PATENT OFFICE 2,054,620

PRINTING MEDIUM AND METHOD OF MANUFACTURING

Abraham L. Freedlander, Dayton, Ohio, assignor to The Dayton Rubber Manufacturing Company, Dayton, Ohio, a corporation of Ohio Application September 26, 1934, Serial No. 745,604

3 Claims. (Cl. 101—217)

My invention relates to printing surfaces and to a method of manufacturing such surfaces.

The object of my invention is to produce printers' rollers, blankets and transfer mediums for transferring ink impressions from a plate to a surface to be printed; particularly, it is my object to provide such a medium either in cylindrical roll form or in flat plate form which comprises a relatively thick body of soft material such as rubber and a relatively thin but substantial coating of a synthetic resin such as that made from divinyl acetylene which is impervious to changes in condition of temperature and moisture and impervious to the action of acids and alkalis in inks.

It is a further object to provide such a combination where the supporting rubber compound has porosity but is not sponge-like.

It is my object to provide a porous rubber body preferably relatively stiffer than a solid rubber body but actually, by reason of the pores in the rubber, capable of a greater yielding action and actually softer.

It is my object to provide such a porous rubber body with a substantial coating of non-rubber material, such as described above.

It is a further object to provide both types of bodies with a smooth hard surface having the proper tack for the accurate acquisition of the ink impression and its transfer to the surface to be printed.

It is a further object to provide a plate of this composite material so that it may be wrapped around a printing roll and, when so wrapped, the exterior, non-rubber surface is sufficiently stretched to give a very smooth, taut surface to facilitate the acquisition and transfer of the ink impression.

It is a further object to provide the supporting rubber body so as to have an increasing hardness from the inner portion of the surface towards the outer portion. This progressively hard or decreasingly soft body has mounted on it the coating of non-rubber material.

It will be understood that in this art heretofore glue and glycerin rolls and blankets have been employed. These are very susceptible to changes in moisture and temperature. The surfaces are also easily attacked by acids and alkalis. By using the synthetic resin coating of sufficient depth a smooth hard surface of the character heretofore described is provided while the type of rubber support described will give a very soft base for the support of the coating. I prefer this supporting base to have a Shore Durometer hardness factor of from 5 to 10. I can control the porosity in order to control the resiliency and softness by adjusting the accelerator.

Referring to the drawing:

Figure 1 is a section through the flat printing medium of my invention;

Figure 2 is a side elevation of the porous form of supporting medium;

Figure 3 is a section through the roll showing the progressive zones of different hardness with the coating of the non-rubber synthetic rubber;

Figure 4 is a view of the roller shaft on which is mounted one of the plates of the material shown in Figures 1 and 2.

Referring to the drawing in detail, 1 is a homogeneous, relatively soft rubber body of approximately the thickness indicated in the drawing having a substantial but relatively thinner coating 2 vulcanized thereto of a synthetic resin, such as divinyl acetylene.

For instance, the material divinyl acetylene which results from the vinyl derivatives of acetylene is prepared by reacting acetylene in the presence of a non-alkali catalyst comprising cuprous chloride. A non-benzenoid polymer of acetylene having the empirical formula $C_8H_8$ may be employed. A pre-formed drying oil which is a liquid, non-volatile polymerization product of acetylene may be used. This rubber-like material may be referred to briefly as a class of material as a divinyl acetylene polymer. Isoprene on standing passes slowly into an elastic solid having the chemical composition and many of the chemical reactions of rubber but is resistant to the attack of oils and acids. I also desire to comprehend the use of polymethylene-sulfide, a polysulfide reaction product. I also comprehend the use of a plastic polymer chloroprene (reaction product of monovinylacetylene and hydrochlorid acid); or polychloroprene and polybromoprene.

The respective parts 1 and 2 are submerged in a container of hot water under pressure and kept there sufficiently long to effect a cure. The approximate temperature of the water is from 250 to 260 degrees and the pressure is from 150 to 200 pounds. The approximate period of time varies with the nature of the rubber and the synthetic compound but may range from a few minutes to several hours.

After these two parts are thus separately manufactured, they are applied to one another either by cementing and cured to one another in hot air under pressure for a period of time, or they may be vulcanized to one another in a steam press. The uncured bodies 1 and 2 may be placed together immediately and cured together under water pressure, as heretofore described, or may be vulcanized one to the other directly.

By controlling the amount of acceleration in the body 1 I can control the amount of porosity, that is, the number and size of the irregular spaces 3 found in the porous medium 4 of Figure 2. Thus, I provide a harder and more substantial supporting body so far as the body itself is concerned, but, due to the irregular spaces 3, I am enabled to get a really softer supporting body than the material shown in Figure 1 at 1.

Referring to the roll shown in section in Figure 3, I have illustrated diagrammatically the progressive hardness. The area designated 5 is softer than the area 6, which, in turn, is softer than the area 7. In practice, there is no distinct dividing line between these areas of different softness and hardness but I have illustrated them diagrammatically for the purpose of description.

This roll is vulcanized upon the axle of the roll marked 8 but the roll carries a synthetic rubber or synthetic resin covering 9.

If it is desired to turn the flat plates shown in Figures 1 and 2 into a roll, they can be wrapped around the axle 8 leaving a space 10 between the abutting ends so as to enable the operator of the roll in cases where transfer is to be made from a design to a metal sheet to gauge the beginning and ending of the application of the design on the sheet.

It is this arrangement that serves to stretch the outer surface of the synthetic coating 2 to provide a very smooth hard impervious surface for the acquisition of ink impressions and their transfer to a surface to be printed.

If desired, and I comprehend it within my invention, a gelatin or combination of gelatin and glue roll may be employed in the place of the rubber supporting body, such as 1 or 4, and then the coating of synthetic rubber mounted thereon. Any suitable synthetic resin in place of the synthetic rubber may be employed. Such a coating may be applied by inflating the coating and slipping it over the gelatin roll, thus protecting it from the action of the acids and alkalis in inks and very largely from the changes in temperature and moisture, but my preferred form is the use of a relatively heavy rubber blanket with a substantial coating of synthetic resin on the top thereof. This coating is rubber-like in all of its characteristics, has the proper tack, can be cleaned without injury to its surface and is impervious to the changes in temperature, moisture and attacks of acids and alkalis.

In particular, by the regulation of the porosity of the supporting blanket, the size of the bubbles or spaces, and the hardness of the material surrounding the spaces, I can adjust my product to a variety of different uses where differences in hardness and differences in the total ultimate softness are necessary in order to accommodate the product to different uses.

It will be understood that I comprehend within "non-rubber materials" both natural and synthetic materials and compounds which have the properties of resiliency, can have imparted to their surface an impervious condition and which are inert to inks, oils, driers, solvents, acids and temperature and moisture conditions, particularly those conditions met in printing. The compounds mentioned for this purpose have peculiar properties not found in rubber of resisting over long periods the action of such material and conditions which would deteriorate rubber.

It will be further understood that the hot water and air vulcanizing processes or their equivalent are comprehended within my invention, and any similar process is comprehended which will produce a homogeneous soft product which removes the trapped air between the plies, and results in a soft, velvety product.

It will be understood that I desire to comprehend within my invention such modification as may be necessary to adapt it to varying conditions and uses.

Having thus fully described my invention, what I claim as new and desire to secure by Letters Patent, is:

1. A new article of manufacture for use as a printing medium, comprising a body which is relatively soft on the side to be supported and which increases progressively in its hardness from the supported side to the other side, and a synthetic resin coating thereon.

2. A new article of manufacture for use as a printing roller having a resilient body whose hardness increases progressively and gradually from the center to the exterior thereof and a synthetic resin coating on said roller.

3. A new article of manufacture for use as a printing roller having a resilient body whose hardness increases progressively and gradually from the center to the exterior thereof and a synthetic resin coating on said roller, said coating comprising such a material as synthetic rubber.

ABRAHAM L. FREEDLANDER.